US010446018B1

United States Patent
Han et al.

(10) Patent No.: US 10,446,018 B1
(45) Date of Patent: Oct. 15, 2019

(54) CONTROLLED DISPLAY OF WARNING INFORMATION

(71) Applicant: Apple Inc., Cupertino, CA (US)

(72) Inventors: Byron B. Han, San Jose, CA (US); Kjell F. Bronder, San Francisco, CA (US); Scott M. Herz, Santa Clara, CA (US); Russell Y. Webb, San Jose, CA (US)

(73) Assignee: Apple Inc., Cupertino, CA (US)

( * ) Notice: Subject to any disclaimer, the term of this patent is extended or adjusted under 35 U.S.C. 154(b) by 39 days.

(21) Appl. No.: 15/275,107

(22) Filed: Sep. 23, 2016

Related U.S. Application Data

(60) Provisional application No. 62/232,800, filed on Sep. 25, 2015.

(51) Int. Cl.
*G08B 29/02* (2006.01)
*G08B 5/36* (2006.01)
*G08B 21/18* (2006.01)

(52) U.S. Cl.
CPC .............. *G08B 29/02* (2013.01); *G08B 5/36* (2013.01); *G08B 21/182* (2013.01)

(58) Field of Classification Search
CPC ........ G07C 2009/00507; B60R 16/037; G05D 1/0016; G05D 1/0038; G05D 1/0088; G05D 2201/0207; G02B 27/01; G06K 9/00805; G01C 21/3697
See application file for complete search history.

(56) References Cited

U.S. PATENT DOCUMENTS

| | | | |
|---|---|---|---|
| 5,732,143 A | 3/1998 | Andrea et al. | |
| 5,825,897 A | 10/1998 | Andrea et al. | |
| 5,867,574 A | 2/1999 | Eryilmaz | |
| 5,937,070 A | 8/1999 | Todter et al. | |
| 7,840,404 B2 | 11/2010 | Xi et al. | |
| 8,031,882 B2 | 10/2011 | Ding | |
| 8,462,193 B1 | 6/2013 | Truong et al. | |
| 8,488,822 B2 | 7/2013 | Klemmensen | |
| 10,096,330 B2 | 10/2018 | Kohmura et al. | |
| 2006/0106522 A1* | 5/2006 | Obradovich | B60R 16/0231 701/96 |
| 2010/0222939 A1* | 9/2010 | Namburu | G07C 9/00111 701/2 |
| 2012/0095619 A1* | 4/2012 | Pack | G05D 1/0038 701/2 |
| 2013/0079964 A1* | 3/2013 | Sukkarie | G01C 21/3469 701/22 |
| 2016/0142538 A1 | 5/2016 | Bredikhin et al. | |

\* cited by examiner

*Primary Examiner* — Mirza F Alam
(74) *Attorney, Agent, or Firm* — Robert C. Kowert; Meyertons, Hood, Kivlin, Kowert & Goetzel, P.C.

(57) ABSTRACT

Some embodiments provide a warning prompt control module which adjustably controls the display of warning prompts for vehicle elements in a vehicle, based on a determined profile with which the occupant is associated. An occupant detected in the vehicle interior can be associated with a profile based on a sensor data representation of the occupant correlating with a sensor data representation included in the profile, accessing a profile from a device supporting the occupant, etc. A profile can include interaction history data which indicate historical interactions with warning prompts for a vehicle element. Displaying a warning prompt for a vehicle element can be adjustably controlled based on the interaction history data, included in a profile, which is associated with the vehicle element.

25 Claims, 7 Drawing Sheets

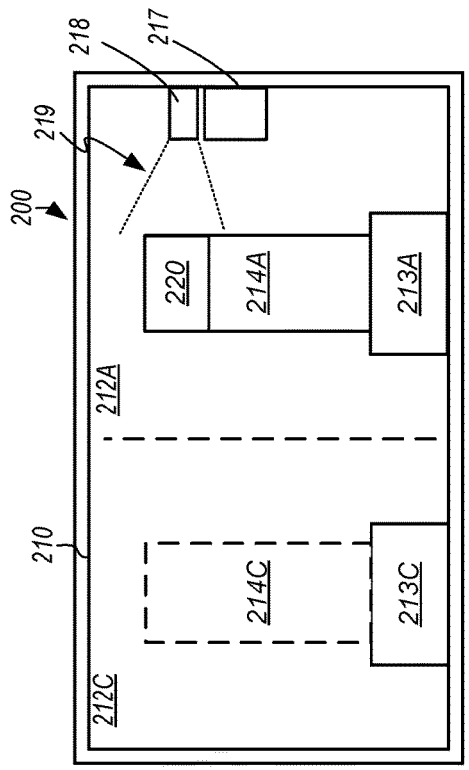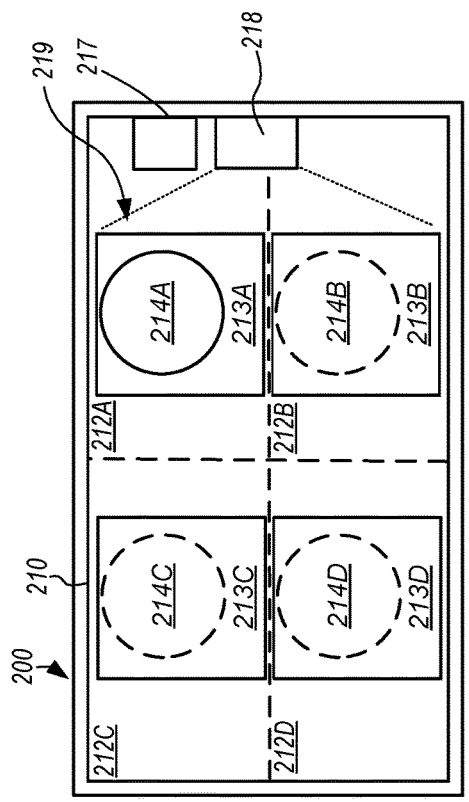

CONTROLLED DISPLAY OF WARNING INFORMATION

This application claims benefit of priority of U.S. Provisional Application Ser. No. 62/232,800, filed Sep. 25, 2015, which is hereby incorporated by reference herein in its entirety.

BACKGROUND

Technical Field

This disclosure relates generally to navigation of a vehicle, and in particular to controlled display of prompts which provide warning information to an occupant of a vehicle based on a history, associated with the occupant, of user interaction with prompts.

Description of the Related Art

Vehicles often include one or more elements which can augment manual navigation of the vehicle, an occupant's ride experience within the vehicle, some combination thereof, etc. For example, a vehicle can include a rear-view camera device which captures images of portions of an external environment which is proximate to a rear end of the vehicle and a display interface, in the vehicle interior, which displays images captured by the rear-view camera device to a vehicle occupant. As a result, the vehicle occupant can utilize the captured images to navigate the vehicle with an augmented situational awareness of a portion of the external environment behind the vehicle.

In some cases, proper control of a vehicle through use of a vehicle element involves occupant utilization of the element in a particular manner. Such a manner of utilization may not be necessarily intuitive. In order to verify that the occupant is informed with regard to proper utilization of a vehicle element, the vehicle can provide, via one or more interfaces, a prompt which includes information indicating how the element can be utilized to augment the driving experience. In addition, in some cases, the prompt can include information indicating information indicating how an occupant should refrain from utilizing the element in order to augment the driving experience. For example, a prompt associated with a rear-view camera element can include a message indicating that the rear-view camera images displayed to an occupant are supplementary to manual observation of the external environment and that the occupant, when utilizing the captured images to augment situational awareness, should not utilize the images in place of manual observation of the portion of the external environment behind the vehicle. Some prompts can require active occupant interaction with one or more vehicle interfaces, which can indicate occupant acknowledgement of the prompt, before utilization of one or more vehicle elements is enabled.

SUMMARY OF EMBODIMENTS

Some embodiments provide a warning prompt control module which adjustably controls the display of warning prompts for vehicle elements in a vehicle to an occupant of the vehicle, based on a determined user profile with which the occupant is associated. An occupant detected in the vehicle interior can be associated with a user profile based on a sensor data representation of the occupant correlating with a sensor data representation included in the user profile, accessing a user profile from a user device supporting the occupant, etc. A user profile can include interaction history data which indicate historical interactions between the user and warning prompts for a vehicle element. Displaying a warning prompt for a vehicle element to a user can be adjustably controlled based on the interaction history data, included in a user profile of the user, which is associated with the vehicle element.

Some embodiments provide an apparatus which includes a warning prompt control module which can be installed in a vehicle and adjustably controls warning prompts displayed to occupants of the vehicle based on warning prompt interaction histories associated with the occupants. The warning prompt control module is configured to associate an occupant located in an interior of the vehicle with a particular user profile, of a plurality of user profiles, and adjustably display warning prompts for a particular vehicle element included in the vehicle, via an interface of the vehicle, in response to trigger events associated with the vehicle element. The occupant is associated with a particular user profile based on a comparison between a sensor data representation of the occupant and a sensor data representation associated with a user of the user profile. Warning prompts are adjustably displayed based on a warning prompt interaction history associated with the particular user profile and the particular vehicle element.

Some embodiments provide an apparatus which includes a warning prompt control module configured to be installed in a vehicle and adjustably control warning prompts displayed to occupants of the vehicle based on warning prompt interaction histories associated with the occupants. The warning prompt control module is configured to associate an occupant located in an interior of the vehicle with a particular user profile associated with a particular user device determined to be supporting the occupant and adjustably display warning prompts for a particular vehicle element included in the vehicle, via an interface of the vehicle, in response to trigger events associated with the vehicle element. The occupant is associated with the particular user profile based at least in part upon detection of the user device within the interior of the vehicle and communication of data associated with the particular user profile from the particular user device to the warning prompt control module. Warning prompts are adjustably displayed based on a warning prompt interaction history associated with the particular user profile and the particular vehicle element.

BRIEF DESCRIPTION OF THE DRAWINGS

FIG. 2A-B illustrate a block diagram schematic of a vehicle which includes an interior which further includes a set of interior positions in which various occupants can be located, at least one sensor device which can monitor one or more of the occupants in the vehicle interior, and at least one vehicle interface which can provide warning prompts to occupants, according to some embodiments.

Figure 1:
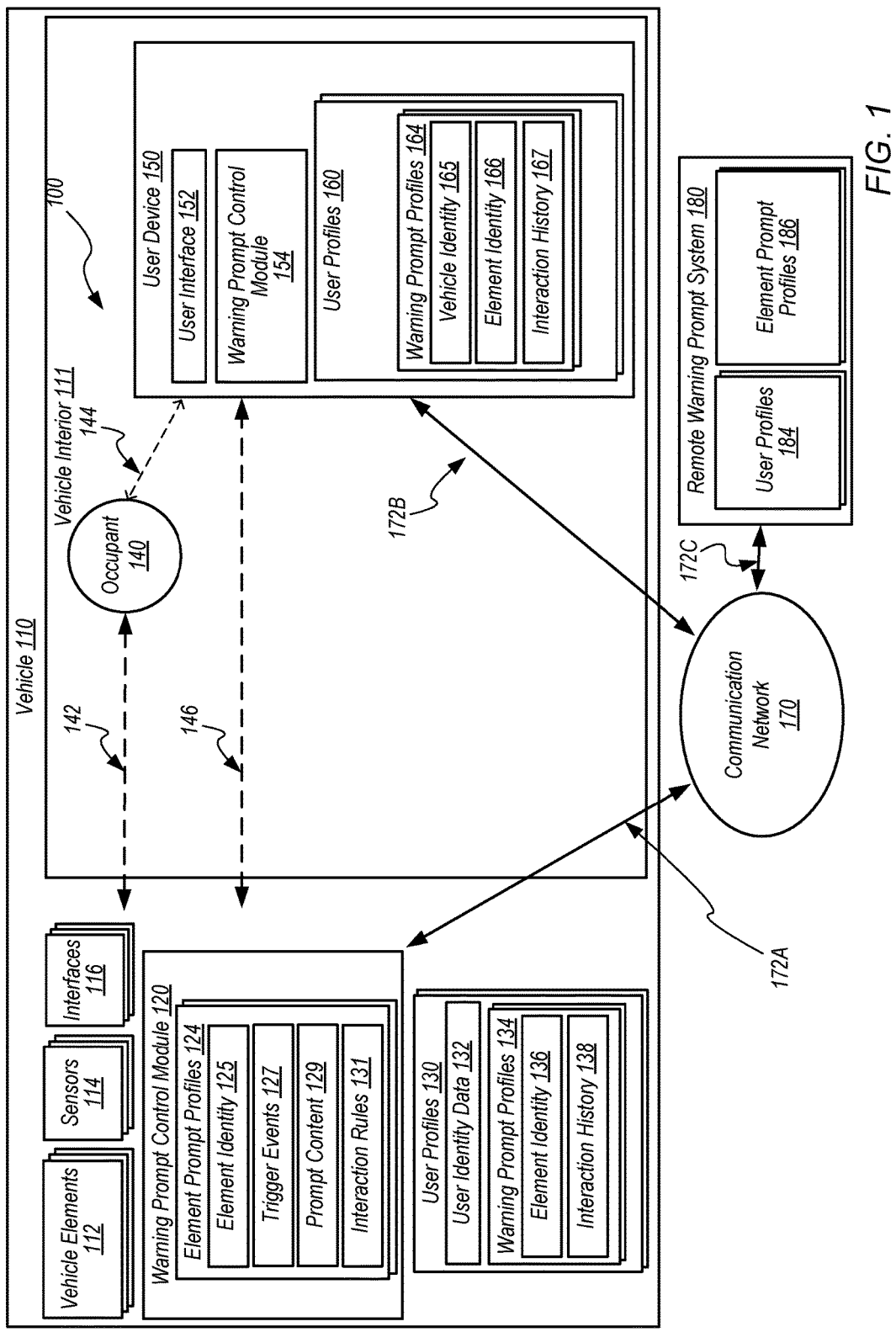
FIG. 1 illustrates a schematic block diagram of a vehicle, an occupant of the vehicle, a user device supporting the occupant, and a remote warning prompt system, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

FIG. 1 illustrates a schematic block diagram of a vehicle, an occupant of the vehicle, a user device supporting the occupant, and a remote warning prompt system, according to some embodiments.

System 100 includes a vehicle 110, an occupant 140 of the vehicle 110 that includes a user located within an interior 111 of the vehicle 110, a user device 150 supporting the occupant 140, and a remote warning prompt system 180 which is communicatively coupled, via communication links 172A-C, to one or more of the vehicle 110 and the user device 150 via a communication network 170.

Vehicle 110 will be understood to encompass one or more vehicles of one or more various configurations which can accommodate one or more occupants, including, without limitation, one or more automobiles, trucks, vans, etc. Vehicle 110 can include one or more interior cabins ("vehicle interiors") 111 configured to accommodate one or more human occupants (e.g., passengers, drivers, etc.) 140, which are collectively referred to herein as vehicle "occupants". A vehicle interior 111 can include one or more vehicle interfaces 116 which include one or more user interfaces, including one or more manual driving control interfaces (e.g., steering device, throttle control device, brake control device), display interfaces, multimedia interfaces, some combination thereof, or the like.

Vehicle 110 includes various vehicle elements 112 which can each perform various functions which augment a driving experience of the occupant 140 within the vehicle 110. For example, a vehicle element 112 can include a rear-view camera device which captures images of a portion of an external environment, which is external to vehicle 110, proximate to a rear end of the vehicle 110. Such a rear-view camera device can augment manual navigation of the vehicle 110 by occupant 140, by providing captured images of the external environment which the occupant 140 can utilize to monitor portions of the external environment. In another example, a vehicle element 112 can include a map display which provides a graphical representation of a present position of the vehicle 110 in a geographic region. Such a map display, which can be generated based at least in part upon geographic positioning data generated by one or more geographic positioning sensor devices, including a GPS device, can augment manual navigation of the vehicle 110, by occupant 140, by providing the occupant 140 with information indicating at least a present position of the vehicle relative to various aspects of the external environment, including roadways, landmarks, etc.

Vehicle 110 includes various sensor devices 114, also referred to herein as "sensors", which generate sensor data regarding one or more portions of an environment. A sensor which generates sensor data regarding a particular environment can be referred to as "monitoring" the environment. Some sensor devices 114 include sensor devices which monitor one or more portions of an interior of the vehicle, also referred to as a vehicle "cabin" of the vehicle, in which one or more occupants 140 can be located. Such sensor devices 114 can be referred to as interior sensor devices. In some embodiments, vehicle 110 includes one or more interior sensor devices 114 which comprise one or more camera devices which, to monitor at least a portion of the vehicle interior, capture one or more images of a portion of the vehicle interior which is located within a field of view of the one or more camera devices.

Vehicle 110 includes one or more various interfaces 116, also referred to herein as "vehicle interfaces" 116, which can provide information associated with one or more vehicle elements 112, sensors 114, etc. A vehicle interface 116 can include a user interface via which an occupant 140 can interact with one or more vehicle elements 112. A vehicle interface 116 can include one or more of a display interface, a touchscreen interface, a button interface, an audio interface, a touch-sensitive interface, etc. In some embodiments, an interface 116 includes a display interface which provides an output of one or more vehicle elements 112, including one or more of a rear-view display provided by a rear-view camera device 112, a map display provided by a geographic positioning element 112, etc.

In some embodiments, the vehicle 110 is configured to present, to an occupant 140 of the vehicle 110 via one or more interfaces 116, one or more various warning prompts associated with one or more elements 112 of the vehicle 110. A warning prompt associated with a vehicle element 112 can be referred to herein as a warning prompt "for" the vehicle element 112 and provides one or more sets of content which provide warning information, to the occupant 140, which is associated with proper utilization of the vehicle element 112 to augment the driving experience of vehicle 110, including augmenting the safety of the occupant 140.

Vehicle 110 includes a warning prompt control module 120 which controls the display of warning prompts for various elements 112 to an occupant 140 of the vehicle 110. In some embodiments, module 120 stores separate sets of warning prompt profiles associated with separate vehicle elements 112 and is configured to display one or more particular warning prompts for one or more particular vehicle elements 112, via one or more particular interfaces 116, in response to detection of one or more particular trigger events associated with the one or more vehicle elements 112.

A trigger event can include the vehicle 110 being started, a detection of new occupancy of a particular portion of the vehicle interior by an occupant 140, etc. Module 120, in response to detection of a trigger event associated with a vehicle element, can generate a warning prompt for the vehicle element, where the warning prompt includes a particular set of content associated with the vehicle element. For example, where an element 112 includes a rear-view camera, a warning prompt associated with the camera can be associated with a trigger event which comprises the vehicle 110 being adjusted into a reverse-drive gear, such that an engine of the vehicle 110 is configured to drive the vehicle 110 in a reverse direction. Module 120, based at least in part upon detecting that the trigger event associated with the warning prompt for the camera has occurred, provide the warning prompt associated with the camera to the occupant 140 via a particular interface 116. In some embodiments, the warning prompt includes a particular set of content, of the warning prompt content associated with the vehicle element, which is selected based on the particular trigger event, of a plurality of trigger events associated with the vehicle element, which is determined to have occurred.

In some embodiments, module 120 is configured to selectively control providing one or more warning prompts associated with one or more elements 112, based at least in part upon determinations that an occupant 140 of the vehicle is a user associated with a particular user profile which includes a warning prompt profile indicating that the user has interacted with one or more warning prompts for one or more vehicle elements 112 in the vehicle 110 in the past. In some embodiments, the module 120 is configured to determine that an occupant 140 is a user associated with a particular user profile, determine that the profile includes an interaction history associated with warning prompts for a particular vehicle element 112 which indicates that the user has interacted with the warning prompts for the particular vehicle element more than a threshold quantity of times and, based at least in part upon a determination of a trigger event associated with the particular warning prompt, controllably provide the warning prompt based on the interaction history associated with the particular user profile.

In some embodiments, such controllable provision of the warning prompt includes refraining from providing the warning prompt under certain conditions. For example, in some embodiments, module 120 provides a warning prompt associated with an element 112 to an occupant in response to each trigger event associated with the warning prompt, based at least in part upon a determination that a detected occupant has interacted with the warning prompt less than a certain threshold number of times. In some embodiments, when the number of interactions by the detected occupant meets a certain threshold, the module 120 can provide the warning prompt associated with the element 112 to the occupant at a frequency which is less than in response to every trigger event associated with the warning prompt. In some embodiments, when the number of interactions by the detected occupant meets a certain threshold, the module 120 can disregard one or more trigger events associated with the vehicle element 120, so that the module 120 refrains from providing the warning prompt for the element 112 to the occupant 140 in response to a determined occurrence of the one or more trigger events. Because the occupant is determined to have interacted with the warning prompt more than a threshold number of times which can be associated with likely understanding of the warning information associated with the vehicle element, additional provisions of the warning prompt to the occupant can be determined to have reduced utility in informing the occupant of how to properly utilize the vehicle element.

In some embodiments, module 120 can provide a warning prompt, including a particular set of warning prompt content, to an occupant 140 in response to particular occurrences of trigger events, based at least in part upon monitoring one or more aspects of the occupant's driving performance. For example, based on monitoring the manual driving of the vehicle 110 by the occupant 140, module 120 can determine that the occupant does not have at least a minimum level of understanding of proper utilization of an element 112 and can adjust the trigger events upon which a warning prompt for the element is provided to the occupant and the content of the warning prompt.

Module 120 includes a set of separate element warning prompt profiles 124, also referred to herein as "element prompt profiles", which are each associated with warning prompts for separate vehicle elements 112 included in the vehicle 110. Each separate element prompt profile 124 includes identity data 125 which identifies the particular vehicle element 112 with which the respective profile 124 is associated. The profile 124 includes a set of trigger event data 127 which characterize one or more trigger events associated with the particular vehicle element 112, where a warning prompt for the vehicle element 112 is provided, via one or more interfaces 116, in response to a determination of an occurrence of one or more of the trigger events characterized in data 127. The data 127 can include model sets of sensor data which correspond to a trigger event, where the trigger event is determined to have occurred when one or more sets of sensor data generated by one or more sensors 114 at least partially matches the sensor data which corresponds to the trigger event. The data 127 can include data which indicate a set of events where, based on a determination of an occurrence of the set of events, an occurrence of a trigger event associated with the warning prompt for the vehicle element is determined to have occurred, such that, in response, a warning prompt for the vehicle element 112 can be provided via one or more interfaces 116.

The prompt profile 124 can include one or more sets of warning prompt content data 129 which specifies content of a warning prompt for the vehicle element identified in data 125. The specified content can include one or more sets of text content, audio content, visual content, etc. A warning prompt for the vehicle element can include various sets of content data 129 based on a determination of various trigger events 127, various interaction rules 131, etc. For example, where trigger event data 127 includes data identifying multiple separate trigger events, content data 129 can include multiple separate sets of warning prompt content which are each associated with one or more various trigger events characterized by at least a portion of data 127, where module 120 provides a warning prompt which includes a particular set of content 129 based on a determination of an occurrence of a particular trigger event characterized by data 127.

A prompt profile 124 includes a set of warning prompt interaction rules data 131 which specifies how one or more of trigger events 127, content of warning prompts 129, etc. for the vehicle element identified in data 125 can be adjusted, utilized, etc. based on warning prompt interaction history associated with a user profile of an occupant 140 of the vehicle 110. The user profile can be a user profile of a user which is a particular occupant 140, including an occupant located in a particular driver portion of the vehicle 110 interior 111.

Interaction rules data 131 can specify particular adjustments to one or more sets of trigger events 127, prompt content 129, etc. based on determination that an interaction history included in a user profile indicates interaction with the warning prompt associated with profile 124 which exceeds one or more particular threshold quantities. In some embodiments, rules data 131 specifies adjustments to one or more sets of trigger events 127, prompt content 129, etc., selective utilization thereof, etc. based on determining a certain level of occupant comprehension of provided warning prompts via monitoring an occupant, concurrent with a warning prompt being provided, via one or more sensor devices 114. In some embodiments, rules data 131 specifies adjustments to one or more sets of trigger events 127, prompt content 129, etc. based on determining a certain level of occupant comprehension of provided warning prompts via monitoring driving performance associated with manual navigation of vehicle 110 by an occupant.

In some embodiments, module 120 monitors occupant interaction with one or more warning prompts provided according to one or more profiles 124. Module 120 can selectively enable, disable, etc. one or more vehicle elements 112 based on monitoring an occupant 140 concurrently with one or more warning prompts for the one or more vehicle elements 112 being provided.

Vehicle 110 includes a set of user profiles 130 which are each associated with separate unique users, where a user can be an occupant 140 of the vehicle interior 111. In some embodiments, a present occupant 140 is a user associated with a particular user profile. A module 120 can selectively associate a detected occupant 140 with a particular user profile 130, thereby determining that the detected occupant 140 is a particular user associated with a particular user profile, based on correlating sensor data representations of the occupant 140 with user identity data 132 included in the profile 130. The user identity data 132 included in a profile 130 can include sensor data representations of the user associated with the given profile 130, and module 120 associates occupant 140 with a user profile 130 based on determining a match, above a certain predetermined confidence level, between sensor data representations of the occupant 140, generated based on one or more sensors 114 monitoring the occupant 140, and one or more instances of user identity data 132 included in the profile 130. The user identity data 132 and sensor data representations of the occupant 140 can include one or more sets of facial recognition data.

A user profile 130 can include one or more sets of warning prompt profiles 134 which include information associated with warning prompts for one or more particular vehicle elements 112. The profiles 134 each include element identity information 136 which identifies a particular vehicle element 112 associated with the profile 134. The profiles 134 each further include a set of warning prompt interaction history data associated with the warning prompt for the element 112 identified in data 136, where the interaction history data 138 indicates a history of interactions between the user associated with the user profile 130 and warning prompts for the vehicle element identified via data 136. For example, a history 138 can include data indicating, for warning prompts for the element 112 identified in data 136, a quantity of interactions between the user and warning prompts for the particular element 112 within a certain period of elapsed time.

Module 120 can, in some embodiments, select a particular user profile 130 based on associating a detected occupant 140 of the vehicle 110 with the profile 130. Module 120 can further, based on selecting the particular profile 130, selectively adjust the set of trigger events 127, included in a profile 124 associated with an element 112, to which the module 120 can respond by providing one or more particular warning prompts for the element 112. Module 120 can further, based on selecting the particular profile 130, selectively adjust prompt content 129, included in a profile 124 associated with an element 112, which is associated with one or more particular trigger events 127, based on the interaction rules 131 associated with the one or more warning prompts and the interaction histories 138 included in profiles 134 of the selected profile 130 which are associated with the one or more warning prompts. As a result, where a warning prompt for an element is provided in response to a particular trigger event associated with the element and which includes the default content 129 associated with the particular trigger event 127 characterized in a profile 124 associated with the element 112 is referred to as a "standard" warning prompt, module 120 can adjust the warning prompts for the element 112 which are provided to a user associated with a user profile 130 to be adjusted to be different from the standard warning prompt, based on a user interaction history 138 of the user associated with warning prompts for the element 112.

In some embodiments, module 120 selectively enables a vehicle element 112, disables a warning prompt for the vehicle element 112, some combination thereof, etc. based on determining that the occupant 140 has indicated acknowledgement of the warning prompt via a particular interaction with one or more particular interfaces 116, determining that the occupant 140 has observed the provided warning prompt, on one or more interfaces 116, for at least a certain amount of elapsed time associated with a comprehension threshold period of time associated with occupant comprehension of the content of the warning prompt, some combination thereof, etc.

In some embodiments, module 120 selectively disables a vehicle element 112, refrains from disabling a warning prompt for the vehicle element 112, some combination thereof, etc. based on determining that the occupant 140 has failed to indicate acknowledgement of the warning prompt via a particular interaction with one or more particular interfaces 116, determining that the occupant 140 has observed the provided warning prompt, on one or more interfaces 116, for less than a certain amount of elapsed time associated with a comprehension threshold period of time associated with occupant comprehension of the content of the warning prompt, some combination thereof, etc.

In some embodiments, module 120 adjusts a warning prompt interaction history associated with a user profile with which a present occupant is associated, based on monitoring the occupant concurrently with one or more warning prompts associated with the warning prompt interaction history being provided. For example, where module 120 determines, based on monitoring interactions 142 between an occupant 140 and one or more interfaces 116 of the vehicle 110, concurrently with module 120 providing a particular warning prompt to the occupant 140 via one or more interfaces, that the occupant 140 observes the prompt for less than a threshold comprehension period of time, module 120 can adjust the interaction history of the user profile to not include the monitored interaction as an additional interaction with the prompt for the purpose of determining whether to adjust one or more of trigger events 127, prompt content 129, etc.

In some embodiments, module 120 monitors the driving performance associated with manual navigation of the vehicle 110 by one or more occupants 140 of the vehicle 110 and can adjust one or more sets of interaction history 138 associated with a selected user profile 130 based on monitoring the driving performance of an occupant 140 associated with the selected profile 130. For example, module 120 can monitor one or more aspects of the driving performance of the occupant 140 manually navigating the vehicle 110, based on monitoring sensor data generated by one or more sensor devices 114, including one or more accelerometers, wheel turning sensors, speedometers, etc. Module 120 can, based on determining that one or more aspects of the driving performance of manual navigation of vehicle 110 by a user, including lateral vehicle 110 acceleration, velocity, turn rate, braking rate, etc. exceeds one or more thresholds, adjust one or more sets of interaction histories 138 included in one or more profiles 134 associated with the user.

System 100 includes a user device 150 which supports the occupant 140 and with which the occupant 140 can interact 144 via one or more user interfaces 152 of the device 150. The user device includes a user interface 152, a warning prompt control module 154, and a set of user profiles 160 associated with various individuals, occupants, etc. which can be authorized to utilize one or more functions of the device 150. In some embodiments, the module 154 is configured to perform similar functions as the module 120 included in the vehicle 110, where commands, sensor data, warning prompts, user profile data element prompt profile data, some combination thereof, etc. is communicated between vehicle 110 and module 154 via one or more communication links 146, 172A-B between the vehicle 110 and the user device 150.

The user profiles 160 stored at device 150 can include warning prompt profiles 164. Similarly to the profiles 130 included in vehicle 110, the profiles 164 can include element identity data 166 and interaction history data 167 associated with warning prompts for a particular vehicle element identified by data 166. In addition, the profiles 164 included in a profile 160 includes vehicle identity data 165 which identifies one or more of a unique vehicle, vehicle type, vehicle manufacturer, vehicle make and model, some combination thereof, etc. associated with the warning profiles associated with profiles 164. As a result, an interaction history 167 associated with a profile 164 can be selectively accessed and utilized to adjust warning prompt content and trigger events for warning prompts provided to an occupant 140 supported by the user device 150, based on a determination that the occupant 140 is located in a vehicle 140 which is associated with the vehicle identity data 165 associated with the profile 164.

In some embodiments, warning prompts are adjustably provided to an occupant 140 of the vehicle 110 based on interaction between the warning prompt control module 120 of the vehicle 110 and a user device 150 which supports the occupant 140. The module 120 and the user device 150 can interact via a communication link 146 between the module 120 and the device 150, which can include a wireless communication link. In some embodiments, link 146 includes an ad hoc wireless network link. The link 146 can be established based at least in part upon device 150 being located within a certain physical proximity of the vehicle 110, including the device 150 being located within a particular portion of the vehicle 110 interior. The link can be established by one or more of the module 120 or the device 150 based at least in part upon determining that the device 150 is located within the certain physical proximity. In some embodiments, one or more of the modules 120, 154 can adjustably control the trigger events 127 and prompt content 129 associated with warning prompts for one or more vehicle elements 112 based on one or more warning prompt interaction histories 167 included in a user profile 160 associated with an occupant 140 in the vehicle 110.

System 100 includes a remote warning prompt system 180 which can be communicatively coupled with one or more of vehicle 110 and user device 150 via one or more communication links 172A-C over one or more communication networks 170.

The system 180 can store one or more user profiles 184. In some embodiments, system 180 accesses one or more user profiles 130, 160 and stores, updates, etc. one or more copies of user profiles 184 stored at the system 180 based on the accessing. In some embodiments, one or more warning prompt control modules included in one or more vehicles 110, user devices 150, etc. can access a user profile 184 stored at system 180 via network 170.

The system 180 can store one or more element prompt profiles 186. In some embodiments, system 180 accesses one or more element profiles 124 and stores, updates, etc. one or more copies of element prompt profiles 124 stored at the system 180 based on the accessing. In some embodiments, one or more warning prompt control modules included in one or more vehicles 110 can access an element prompt profile 186 stored at system 180 via network 170.

A user profile can include data, associated with a particular user, which can be referred to as personal data. For example, user identity data included in a user profile via which an occupant can be identified as the user associated with the profile can be referred to as personal data associated with the user.

Users can benefit from use of personal data in managing the provision of warning prompts to users. For example, the personal data can be used to refrain from providing standard warning prompts for a vehicle element, in response to standard trigger events associated with the vehicle element, to a user where the personal data associated with the user indicates that the user has interacted with warning prompts for the vehicle elements at least a certain quantity of times. Accordingly, use of such personal data enables users to receive an augmented driving experience.

Users can selectively block use of, or access to, personal data. A system incorporating some or all of the technologies described herein can include hardware and/or software that prevents or blocks access to such personal data. For example, the system can allow users to "opt in" or "opt out" of participation in the collection of personal data or portions of portions thereof. Also, users can select not to provide location information, or permit provision of general location information (e.g., a geographic region or zone), but not precise location information.

Entities responsible for the collection, analysis, disclosure, transfer, storage, or other use of such personal data should comply with established privacy policies and/or practices. Such entities should safeguard and secure access to such personal data and ensure that others with access to the personal data also comply. Such entities should implement privacy policies and practices that meet or exceed industry or governmental requirements for maintaining the privacy and security of personal data. For example, an entity should collect users' personal data for legitimate and reasonable uses, and not share or sell the data outside of those legitimate uses. Such collection should occur only after receiving the users' informed consent. Furthermore, third parties can evaluate these entities to certify their adherence to established privacy policies and practices.

FIG. 2A-B illustrate a block diagram schematic of a vehicle which includes an interior which further includes a set of interior positions in which various occupants can be located, at least one sensor device which can monitor one or more of the occupants in the vehicle interior, and at least one vehicle interface which can provide warning prompts to occupants, according to some embodiments. The vehicle 200 illustrated in FIG. 2A-B can be included in any of the embodiments herein, including the vehicle 110 shown in FIG. 1.

Vehicle 200 includes an interior 210 which includes various interior positions 212A-D. Each separate interior position 212A-D includes a separate seat 213A-D in which one or more occupants 214A-D can be located.

Vehicle 200 includes a vehicle interface 217 which includes one or more user interfaces via which a vehicle occupant can be provided with one or more warning prompts, interact with one or more vehicle elements, provide acknowledgement indications associated with one or more provided warning prompts, etc. The vehicle interface 217 can include one or more of a display interface, an interactive touchscreen interface, a button interface, a cursor interface, a touch-sensitive interface, etc.

Vehicle 200 further includes at least one vehicle sensor device 218, also referred to herein interchangeably as an interior sensor device, which is configured to monitor at least a portion of the vehicle interior 210 which is encompassed within a field of view 219 of the interior sensor device 218. As shown, where an occupant 214A includes multiple separate body parts, including a face 220, which are located within the field of view 219 of the interior sensor device 218, the sensor can generate sensor data representations of some or all of the occupant 214A, including sensor data representations of one or more of the particular body parts 220 of the occupant. Where a sensor data representation of occupant 214A includes a sensor data representation of a face 220 of the occupant, the occupant 214 can be identified as a particular user and associated with a user profile of the particular user based on a correlation of a sensor data representation of the face 220 and a stored set of sensor data representations of a face of the particular user. The sensor data representations can be processed by one or more portions of an ANS included in the vehicle 200, including one or more monitoring modules, comfort profile modules, feedback modules, etc.

As shown, an interior sensor device 218 included in vehicle 200 can monitor multiple occupants located in multiple various positions of the interior. As a result, sensor data generated by the interior sensor device 218 can be utilized by one or more portions of a warning prompt control module included in the vehicle 200 to monitor one or more aspects of the multiple occupants in the multiple positions in the interior 210. The warning prompt control module can process sensor data generated by the sensor device 218 and, based on the sensor data, detect occupants 214A-D in one or more portions 212A-D of the vehicle interior 210, associate one or more occupants 214 with one or more user profiles, and control the provision of warning prompts to one or more occupants 214, via the vehicle interface 217, based on warning prompt interaction histories associated with the one or more user profiles. In some embodiments, detecting occupants of a vehicle includes determining an absence of occupants in one or more positions of the interior. For example, as shown, occupants 214B-D are absent from positions 212B-D, so that a warning prompt control module included in vehicle 200, monitoring the interior 210 via sensor data representations of the field of view 219 of interior sensor device 218, can determine that occupant 214A occupies position 212A and is alone in the interior 210.

Figure 3:
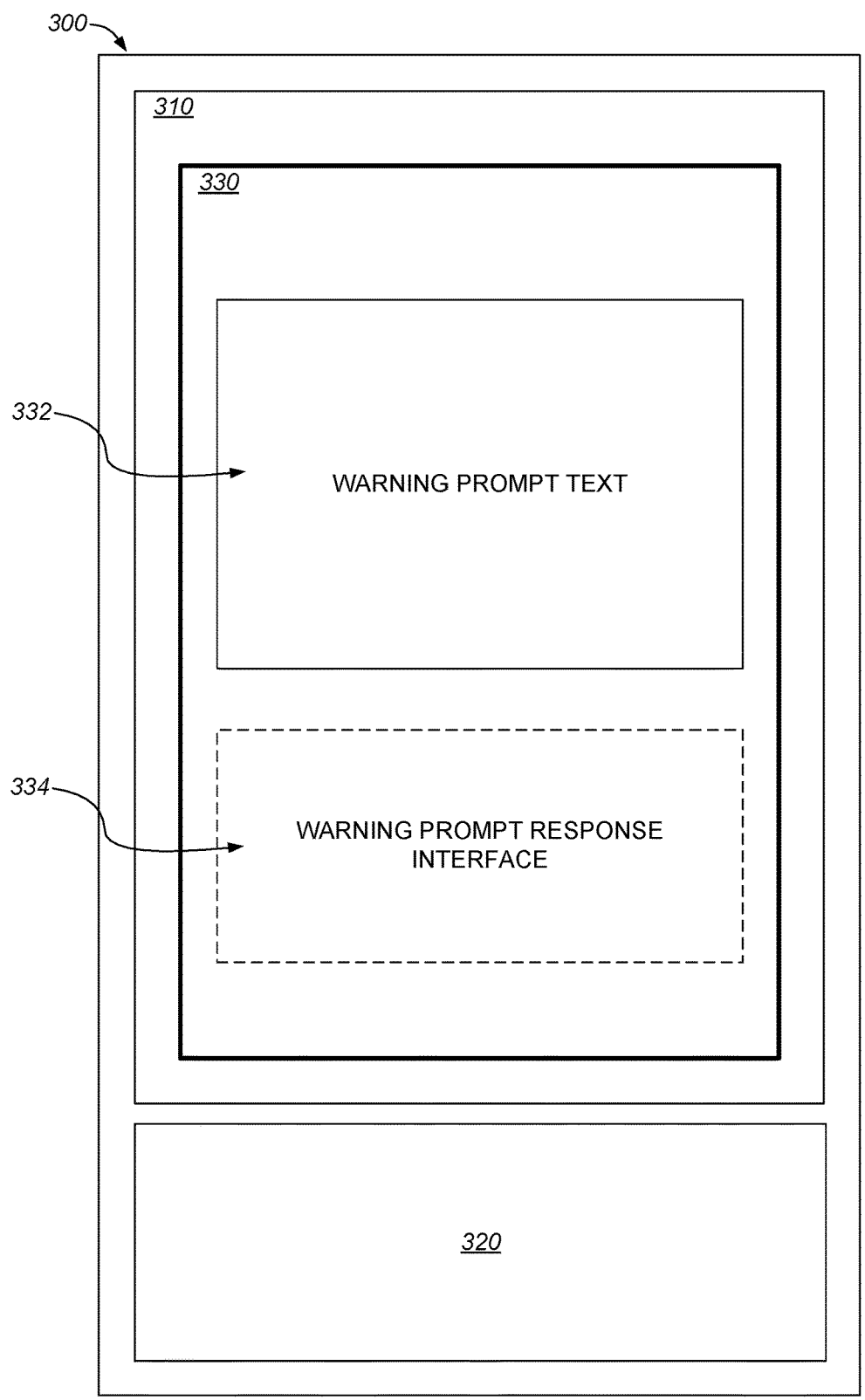
FIG. 3 illustrates a block diagram schematic of a vehicle interface which can provide a warning prompt, according to some embodiments.

FIG. 3 illustrates a block diagram schematic of a vehicle interface which can provide a warning prompt, according to some embodiments. The interface 300 illustrated in FIG. 3 can be included in any of the embodiments of vehicle interfaces included herein, including one or more of the interfaces 116 shown in FIG. 1.

As shown, the interface 116 can include multiple interfaces, including a display screen interface 310 and a touch-sensitive interface 320. As shown, an occupant can be provided with a warning prompt 330 via the display screen interface 310, and the occupant can provide indications of acknowledgement of the warning prompt 330 via interaction with one or more of the interfaces 310, 320. In some embodiments, a warning prompt 330 is displayed based at least in part upon the detection, at a warning prompt control module, of the occurrence of a trigger event associated with a particular vehicle element, where the module provides a particular warning prompt 330 associated with the particular vehicle element based on the occurrence of the trigger event.

As shown, the warning prompt 330 includes warning prompt content which includes warning prompt text 332 associated with the warning prompt. The text 332 can include information which indicates proper utilization of a particular vehicle element by a vehicle occupant, instructions for proper utilization of the vehicle element, etc. In some embodiments, the text 332 can include information instructing the vehicle occupant to provide an indication of acknowledgement of the content of the text 332, thereby indicating understanding of the information provided in the prompt 330.

In some embodiments, the text 332 can include instructions, to a vehicle occupant, to interact with an interface 320 to provide an indication of acknowledgment of the prompt 330. The warning prompt control module can selectively enable the particular vehicle element based at least in part upon a determination that the occupant interaction with the interface 320 has occurred.

In some embodiments, the interface 320 is an audio interface, and the text 332 can include instructions to a vehicle occupant to provide a particular audio message to the interface 320 as acknowledgement. The text 332 can specify the particular audio message, and the warning prompt control module can selectively enable the particular vehicle element based at least in part upon a determination that the particular audio message has been received via the interface 320.

In some embodiments, the warning prompt content included in the prompt 330 includes a response interface 324, including an interactive icon displayed on display 310, via which a vehicle occupant can interact to provide an indication of acknowledgement of the text 332 of the prompt 330.

In some embodiments, the warning prompt 330 content is adjusted based on a user profile associated with a detected occupant of the vehicle in which the interface 300 is included. For example, in some embodiments, a response interface 334 is absent from a warning prompt 330 associated with a particular vehicle element based at least in part upon a determination that a vehicle occupant is associated with a user profile which indicates at least a certain threshold quantity of interactions with warning prompts associated with the particular vehicle element. The warning prompt 330 can include text 332 which can be adjusted, by the warning prompt control module, to be absent of instructions to a vehicle occupant for indicating acknowledgment via an interface 320, 334 based on the determination that a vehicle occupant is associated with a user profile which indicates at least a certain threshold quantity of interactions with warning prompts associated with the particular vehicle element.

Figure 4:
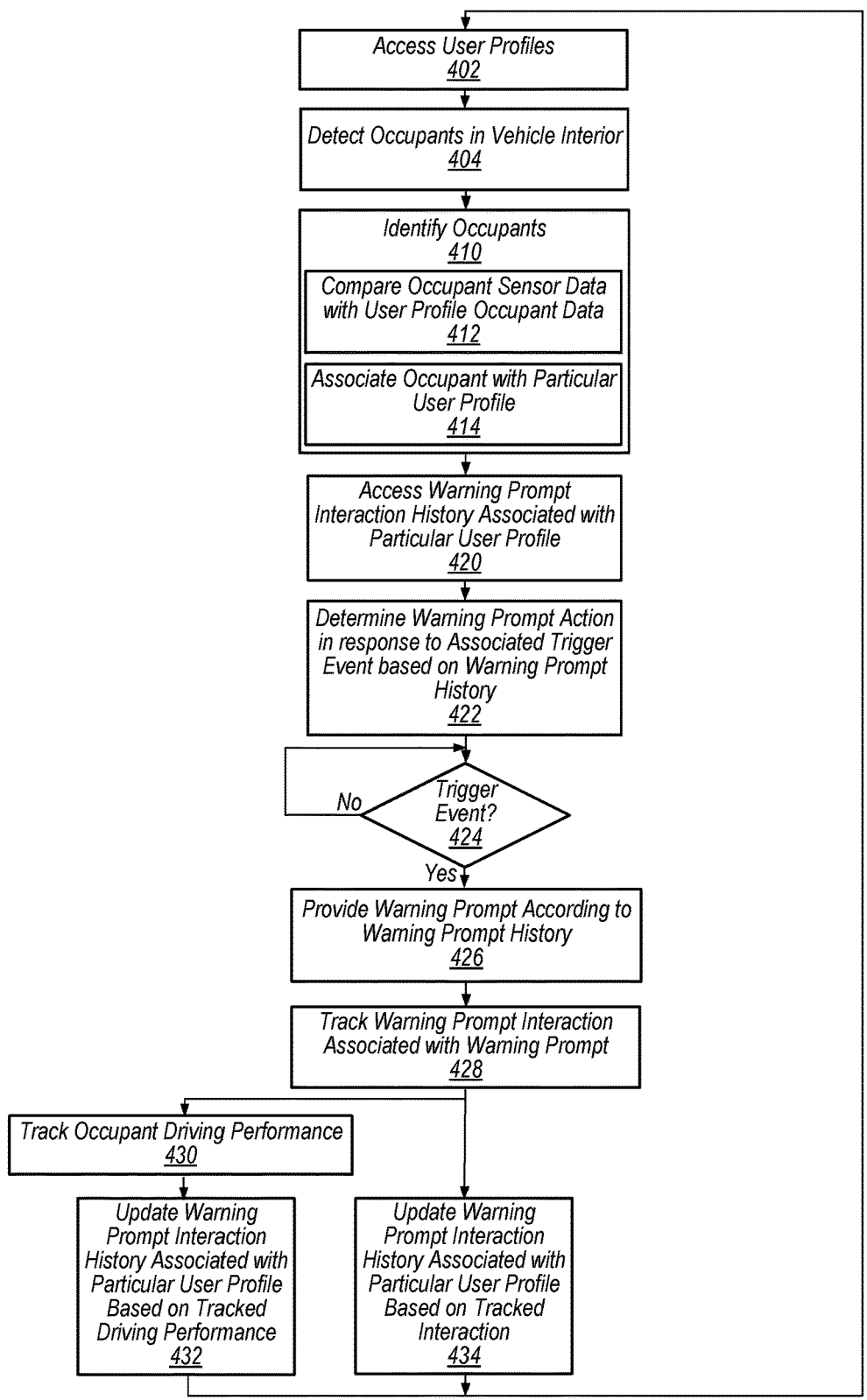
FIG. 4 illustrates managing user profiles and providing warning prompts, at a vehicle, based on associating an occupant, detected via processing vehicle sensor data, with a user profile, according to some embodiments.

FIG. 4 illustrates managing user profiles and providing warning prompts, at a vehicle, based on associating an occupant, detected via processing vehicle sensor data, with a user profile, according to some embodiments. The managing can be implemented by one or more portions of any embodiments of a warning prompt control module included herein, and the one or more portions of the warning prompt control module can be implemented by one or more computer systems.

At 402, one or more user profiles are accessed. The user profiles can be accessed from a database which is included in the same vehicle as the warning prompt control module, a database located in a remote warning prompt system, some combination thereof, etc. Where the database is located in a remote warning prompt system, the accessing at 402 can include accessing the set of user profiles via communication with the remote warning prompt system over one or more communication networks.

A user profile can include one or more of a set of sensor data representations of the user associated with the user profile. Such representations can be referred to herein as user sensor data representations. In addition, a user profile can include one or more sets of warning prompt interaction histories which are associated with interactions, of the user associated with the user profile, with one or more particular warning prompts for one or more particular vehicle elements of one or more particular vehicles. Such interaction histories can include representations of a historical quantity, frequency, etc. of interactions by the user with the particular warning prompt over a particular period of elapsed time. In some embodiments, a user profile includes an occupant data representation of the user profile which includes a set of facial recognition features associated with a face of the occupant associated with the user profile, where the facial recognition features are generated based on implementing a facial recognition processing of a sensor data representation of the occupant.

At 404, one or more instances of sensor data, generated by one or more sensors included in the vehicle, are received and processed to detect one or more occupants in the vehicle interior. Such detection can include determining, based on processing one or more instances of sensor data, that one or more occupants are located in one or more particular portions of the vehicle interior.

Based on the determination, the detection can include generating one or more sets of sensor data representations of the one or more detected occupants. The sensor data can include images, captured by one or more camera devices, of one or more portions of a vehicle interior within fields of view of the one or more camera devices. In some embodiments, the sensor data includes biometric data generated by one or more biometric sensors included in the vehicle.

In some embodiments, the detecting includes determining, based on processing sensor data, that an occupant is located within a particular portion of the vehicle interior. The processing can further include generating a set of occupant sensor data representations which includes a limited selection of the sensor data processed, where the limited selection comprises a selection of the sensor data which includes sensor data representations of the particular detected occupant located within the particular portion of the vehicle interior. A set of occupant sensor data representations which includes sensor data representations of a particular occupant of the vehicle interior can be referred to as a set of occupant sensor data which is associated with the particular occupant.

In some embodiments, generating a set of occupant sensor data includes generating a plurality of sets of occupant sensor data, where each separate set of occupant sensor data includes a separate set of sensor data representations of a separate occupant in the vehicle interior, based on a determination that a plurality of occupants are located in the vehicle interior.

In some embodiments, generating a set of occupant sensor data representations includes generating a set of facial recognition features associated with a particular occupant, based on processing a sensor data representation of a face of the occupant via implementation of one or more facial recognition processes.

At 410, one or more detected occupants of the vehicle interior are identified as one or more particular users associated with one or more particular user profiles, based at least in part upon the one or more sets of occupant sensor data associated with the one or more detected occupants and the accessed user profiles. Identifying an occupant includes comparing occupant sensor data associated with the occupant with one or more user profiles and determining, based at least in part upon the comparison, that at least a portion of the occupant sensor data representations correlates with user sensor data representations included in one or more particular accessed user profiles.

For example, in some embodiments, where a set of occupant sensor data representations includes a set of detected facial recognition features generated based on processing a sensor data representation of a detected occupant via a facial recognition process, the identification at 410 can include comparing, at 412, the set of detected facial recognition features with sets of user facial recognition features included in one or more sets of user sensor data representations include in one or more user profiles. The identification can further include, at 414, associating a detected occupant with a particular user profile based at least in part upon a determination that a set of detected facial recognition features of the detected occupant at least partially match a set of user facial recognition features included in the particular user profile.

In some embodiments, the identifying at 410 can include identifying multiple occupants of the vehicle interior, where the process shown at 410 is implemented in parallel with regard to each of the occupants.

At 420, based at least in part upon associating a detected occupant with a particular user profile at 414, which is based at least in part upon comparison of occupant sensor data representations with user sensor data representations of the user profile at 412, a set of warning prompt interaction histories associated with the particular user profile is accessed. The set of warning prompt interaction histories can include a separate interaction history, by the user associated with the user profile, with warning prompts for separate vehicle elements included in separate types of vehicles.

At 422, based on processing the one or more accessed warning prompt interactions histories include in the particular user profile, where each warning prompt interaction history is associated with at least a separate vehicle element, a particular warning prompt response to one or more associated vehicle element trigger events of the separate vehicle element is determined. The determination at 422 can include determining whether to provide a standard warning prompt associated with a vehicle element in response to an occurrence of a trigger event associated with the vehicle element. For example, where a warning prompt interaction history included in the user profile indicates that the occupant associated with the user profile has interacted with warning prompts associated with a particular vehicle element greater than a certain threshold quantity of times, the determination at 422 can include a determination to refrain from providing the standard warning prompt associated with the vehicle element in response to the trigger event associated with the vehicle element.

Refraining from providing a standard warning prompt can include providing an altered warning prompt, which can include providing the standard warning prompt for a reduced period of time, withdrawing the warning prompt and enabling the associated vehicle element without requiring occupant interaction with a user interfaces, refraining from providing any warning prompt, some combination thereof, etc.

At 424, a determination is made regarding whether a trigger event associated with one or more vehicle elements included in the vehicle has occurred. If so, at 426, a warning prompt response associated with the vehicle element is implemented, based on the determination at 422.

At 428, where a warning prompt is provided, via one or more vehicle interfaces, at 426, user interaction with the warning prompt is tracked. Tracking occupant interaction can include determining whether an identified user has provided an acknowledgement of the warning prompt via interaction with one or more particular vehicle interfaces. In some embodiments, a vehicle element associated with the warning prompt is selectively enabled based at least in part upon a determination that the occupant has provided a particular acknowledgement of the warning prompt via a particular interaction with one or more particular vehicle interfaces. In some embodiments, the tracking is limited to tracking interactions of an identified user located in a particular portion of the vehicle interior, including a driver portion of the interior.

In some embodiments, the tracking at 428 includes monitoring one or more identified users, via sensor data generated by one or more interior sensor devices, concurrently with providing the warning prompt. Such monitoring can include determining, based on sensor data representations of the occupant generated concurrently with the warning prompt being provided, that the user has observed the warning prompt for greater than a threshold period of elapsed time associated with comprehension of the content of the warning prompt. At 434, a warning prompt interaction history included in the user profile associated with the detected occupant and associated with the warning prompt provided at 426 is updated based on the providing at 426 and the tracking at 428. Where the user associated with a user profile is determined, at 428, to have comprehended the warning prompt for a particular vehicle element, provided acknowledgement of the warning prompt via interaction with one or more vehicle interfaces, some combination thereof, etc., the history, included in the profile, which is associated with the element can be updated to increase the quantity of interactions by the occupant associated with the profile with prompts associated with the vehicle element.

At 430, the driving performance of the identified user who is manually navigating the vehicle is tracked, via monitoring of one or more of the occupant via interior sensor devices, driving parameters of the manual navigation via vehicle sensor devices, some combination thereof, etc. At 432, a warning prompt interaction history included in the user profile associated with the identified user and associated with the warning prompt provided at 426 is updated based on the tracking at 430. For example, where a user is determined, at 430, to be utilizing a vehicle element in a manner which is inconsistent with a characterization of proper utilization of the vehicle element, the interaction history associated with warning prompts for the vehicle element can be updated to reduce the quantity of interactions with warning prompts for the vehicle element. As a result, the user, having been determined to be utilizing the vehicle element improperly, is provided with warning prompts which are more frequent, intrusive, etc. until the user is determined to be utilizing the vehicle element properly.

For example, where a vehicle element includes a rear-view camera device, proper utilization of the device includes maintaining manual observation of the external environment behind the vehicle, so that the camera device provides images which supplement the occupant's situational awareness, and the tracking at 430 includes determining that the user is utilizing images captured by the rear-view camera in place of manually observing the environment behind the vehicle, the updating at 432 can include updating an interaction history, included in the user profile with which the user is associated and associated with warning prompts for the rear-view camera, so that the prompts, indicating that proper utilization of the rear-view camera images is as a supplement to manual observation, are more frequent, require manual interaction with a vehicle interface to acknowledge before the rear-view camera is enabled, etc.

In some embodiments, a user profile is associated with a particular user device which can support a user, and the identifying at 410 includes identifying a particular user profile based on identifying a particular user device located in one or more portions of the vehicle interior. The user profile can be stored locally in the vehicle, remotely at a remote system, at the user device, etc. The identifying can include accessing user device identity data which uniquely identifies the user device located in the vehicle interior and associating the user device with a user profile based on a determination that the user device identity data which uniquely identifies the user device matches an instance of user device identity data included in the user profile.

Figure 5:
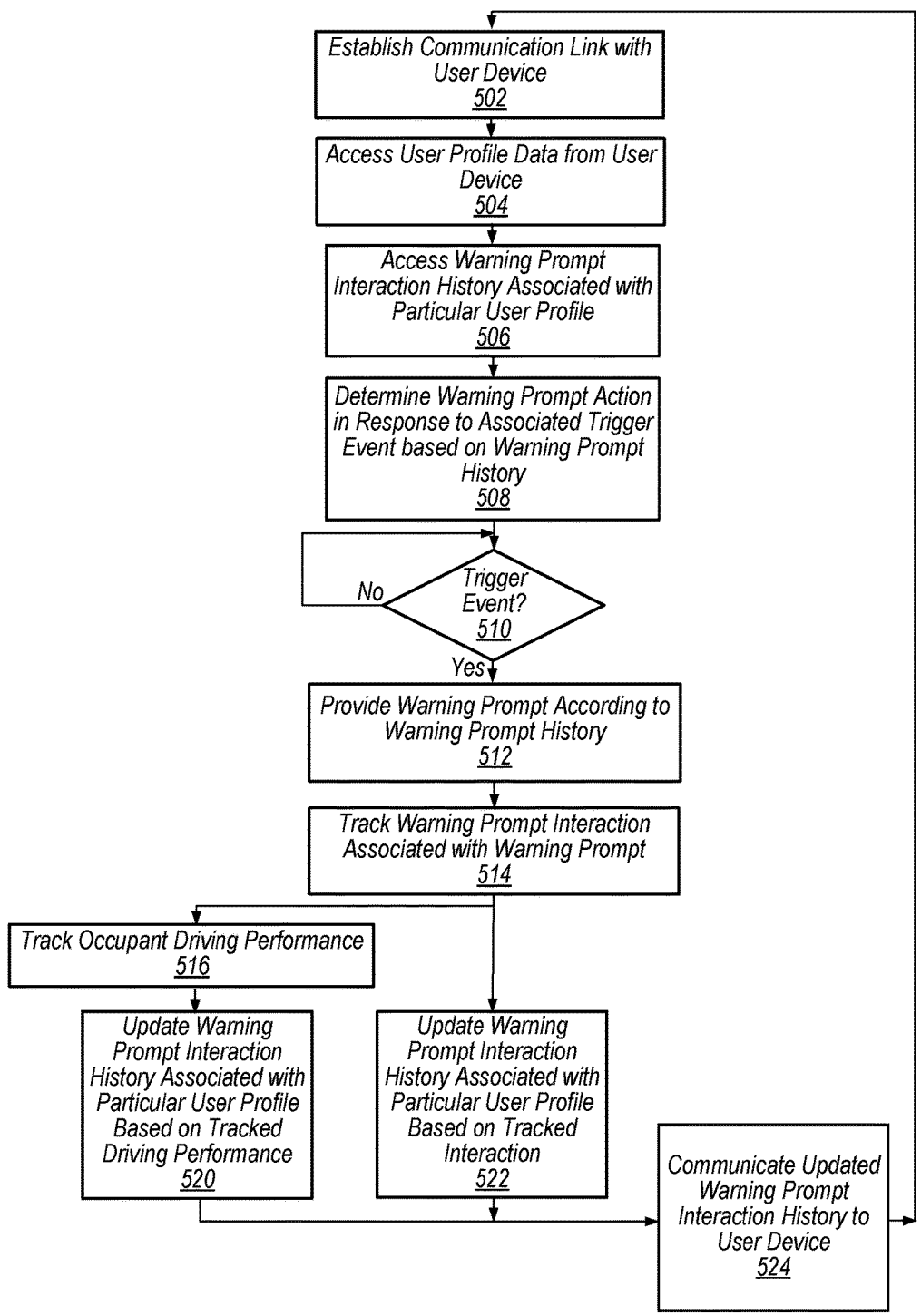
FIG. 5 illustrates managing user profiles and providing warning prompts, at a vehicle, based on a user profile accessed from a proximate user device supporting an occupant, according to some embodiments.

FIG. 5 illustrates managing user profiles and providing warning prompts, at a vehicle, based on a user profile accessed from a proximate user device supporting an occupant, according to some embodiments. The managing can be implemented by one or more portions of any embodiments of a warning prompt control module included herein, and the one or more portions of the warning prompt control module can be implemented by one or more computer systems.

At 502, a user device located within an interior of the vehicle is detected. The user device can be detected via one or more various wireless communication networks. In some embodiments, detecting the user device includes establishing a communication link between the warning prompt control module and the user device. For example, the warning prompt control module can, via an ad hoc wireless communication system, detect a user device based on detection of a wireless communication transceiver of the user device, establishing a communication link, over a wireless communication network with the user device, some combination thereof, etc.

At 504, one or more user profiles stored at the user device are accessed via an established communication link with the user device over one or more communication networks. The accessing can include generating a query, which is communicated to the user device, which requests access to one or more user profiles stored at the user device. The accessing can include receiving a copy of a user profile from the user device, receiving selected data associated with a user profile from the device in response to a specific query for the selected data, some combination thereof, etc.

In some embodiments, user profiles are preferentially accessed from user devices based on an order of priority associated with the particular portions of the vehicle interior in which the various user devices are located. For example, where separate user devices are located in separate portions of the vehicle interior, the accessing at 504 can include first accessing user profiles from a device located in a driver portion of the interior, accessing user profiles from a device located in a front passenger portion of the interior if no user profiles are accessible from user devices in the driver portion, accessing user profiles from devices located in rear passenger portions of the interior if no user profiles are accessible from user devices in the driver or front passenger portions, etc.

In some embodiments, the accessing at 504 includes accessing, from a user device, a particular user profile of a plurality of user profiles stored on the device. The particular user profile can be identified and selectively accessed based on a determination that the particular user profile is active on the user device, relative to other user profiles stored on the device. For example, in some embodiments a user device is utilized, at different times, by different users, and the active user profile is based on the user which the device is presently supporting. As a result, the accessed user profile is the user profile of the user which is presently being supported by the device, while profiles of users not being presently supported by the user device may not be accessed.

At 506, a selected set of warning prompt interaction histories included in an accessed user profile are accessed. The selected warning prompt interactions histories can be selectively accessed based on a determination that vehicle identities associated with the selected set of warning prompt interaction histories matches a vehicle identity of the vehicle in which the warning prompt control module is located. The accessing at 506 can include querying the user device to provide warning prompt interaction histories associated with the accessed user profile which also are associated with a particular vehicle identity. As referred to herein, a vehicle identity can include information which uniquely identifies a particular vehicle, information which identifies vehicles associated with a common manufacturer, information which identifies vehicles associated with a common make and model, information which identifies vehicles associated with a common vehicle owner, some combination thereof, etc. For example, where a user profile includes interaction histories associated with warning prompts for a vehicle element which is included in a set of vehicles made by a common manufacturer, each history can include a vehicle identity identifying the set of vehicles as being associated with the history, and the warning prompt control module can selectively access, at 506, a particular history associated with the user profile based on determining that a vehicle identity included in the history matches, at least in part, a vehicle identity associated with the vehicle in which the warning prompt control module is located.

At 508, based on processing the one or more accessed warning prompt interaction histories include in the particular user profile, where each warning prompt interaction history is associated with at least a separate vehicle element, a particular warning prompt response to one or more associated vehicle element trigger events of the separate vehicle element is determined. The determination at 508 can include determining whether to provide a standard warning prompt associated with a vehicle element in response to an occurrence of a trigger event associated with the vehicle element. For example, where a warning prompt interaction history included in the user profile indicates that the occupant associated with the user profile has interacted with warning prompts associated with a particular vehicle element greater than a certain threshold quantity of times, the determination at 508 can include a determination to refrain from providing the standard warning prompt associated with the vehicle element in response to the trigger event associated with the vehicle element. Refraining from providing a standard warning prompt can include providing an altered warning prompt, which can include providing the standard warning prompt for a reduced period of time, withdrawing the warning prompt and enabling the associated vehicle element without requiring occupant interaction with a user interfaces, refraining from providing any warning prompt, some combination thereof, etc.

At 510, a determination is made regarding whether a trigger event associated with one or more vehicle elements included in the vehicle has occurred. If so, at 512, a warning prompt response associated with the vehicle element is implemented, based on the determination at 508.

At 514, where a warning prompt is provided, via one or more vehicle interfaces, at 512, occupant interaction with the warning prompt is tracked. Tracking occupant interaction can include determining whether the occupant has provided an acknowledgement of the warning prompt via interaction with one or more particular vehicle interfaces. In some embodiments, a vehicle element associated with the warning prompt is selectively enabled based at least in part upon a determination that the occupant has provided a particular acknowledgement of the warning prompt via a particular interaction with one or more particular vehicle interfaces.

In some embodiments, the tracking at 514 includes monitoring the occupant, via sensor data generated by one or more interior sensor devices, concurrently with providing the warning prompt. Such monitoring can include determining, based on sensor data representations of the occupant generated concurrently with the warning prompt being provided, that the occupant has observed the warning prompt for greater than a threshold period of elapsed time associated with comprehension of the content of the warning prompt. At 522, a warning prompt interaction history included in the user profile associated with the detected occupant and associated with the warning prompt provided at 512 is updated based on the providing at 512 and the tracking at 514. Where the occupant associated with the profile is determined, at 514, to have comprehended the warning prompt, provided acknowledgement of the warning prompt via interaction with one or more vehicle interfaces, some combination thereof, etc., the history can be updated to increment the quantity of interactions by the occupant associated with the profile with prompts associated with the vehicle element.

At 516, the driving performance of the occupant who is manually navigating the vehicle is tracked, via monitoring of one or more of the occupant via interior sensor devices, driving parameters of the manual navigation via vehicle sensor devices, some combination thereof, etc. At 520, a warning prompt interaction history included in the user profile associated with the detected occupant and associated with the warning prompt provided at 512 is updated based on the tracking at 516. For example, where an occupant is determined, at 430, to be utilizing a vehicle element in a manner which is inconsistent with a characterization of proper utilization of the vehicle element, the interaction history associated with warning prompts for the vehicle element can be updated to reduce the quantity of interactions with warning prompts for the vehicle element. As a result, the occupant, having been determined to be utilizing the vehicle element improperly, is provided with warning prompts which are more frequent, intrusive, etc. until the occupant is determined to be utilizing the vehicle element properly.

For example, where a vehicle element includes a rear-view camera device, proper utilization of the device includes maintaining manual observation of the external environment behind the vehicle, so that the camera device provides images which supplement the occupant's situational awareness, and the tracking at 516 includes determining that the occupant is utilizing images captured by the rear-view camera in place of manually observing the environment behind the vehicle, the updating at 520 can include updating an interaction history associated with warning prompts for the rear-view camera so that the prompts, indicating that proper utilization of the rear-view camera images is as a supplement to manual observation, are more frequent, require manual occupant interaction with a vehicle interface to acknowledge before the rear-view camera is enabled, etc.

At 524, the updates at 520, 522 to the warning prompt interaction histories, associated with warning prompts for one or more particular vehicle elements, of the user profile are communicated to the user device where the user profile is stored, such that the user profile stored at the user device is updated.

Figure 6:
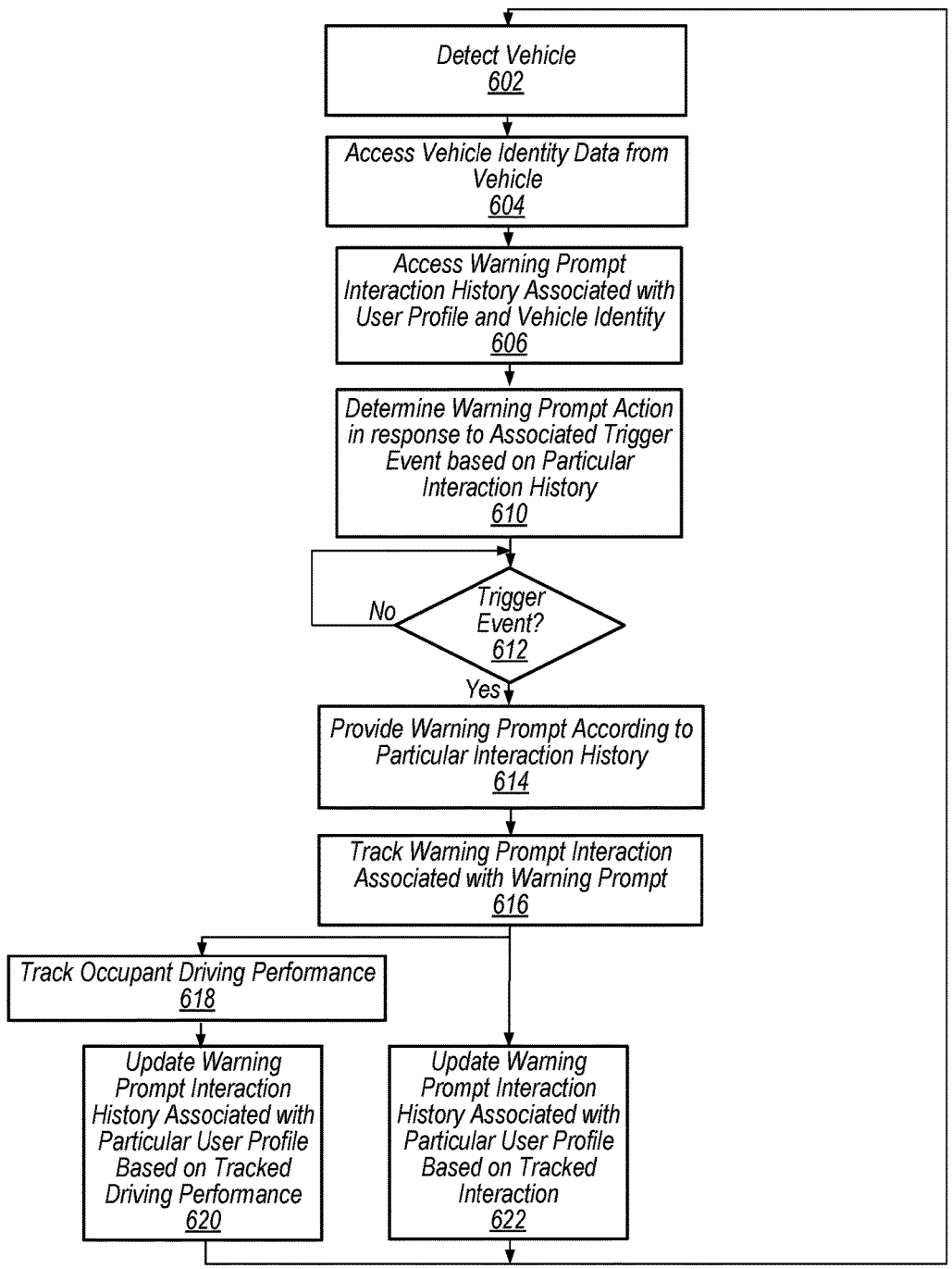
FIG. 6 illustrates managing user profiles and controlling warning prompt display by a vehicle interface, at a user device supporting an occupant of the vehicle interior, based on associating a portion of the user profiles with a vehicle identity, according to some embodiments.

FIG. 6 illustrates managing user profiles and controlling warning prompt display by a vehicle interface, at a user device supporting an occupant of the vehicle interior, based on associating a portion of the user profiles with a vehicle identity, according to some embodiments. The managing and controlling can be implemented by one or more portions of any embodiments of a user device included herein, and the one or more portions of the user device can be implemented by one or more computer systems.

At 602, the user device determines that the user device is presently located within an interior of a particular vehicle. Such a determination can be made based on a determination that the device is within a certain proximity distance of a communication interface included in the vehicle. The determination can be made based at least in part upon detecting a portion of the vehicle via a wireless communication network and establishing a communication link between the user device and the vehicle.

At 604, one or more instances of vehicle identity data associated with the vehicle are accessed from the vehicle. The data can be accessed from the vehicle, over a communication network, based at least in part upon a communication link with the vehicle being established over the communication network. The vehicle identity data can include information identifying one or more of a unique identity of the vehicle, a manufacturer of the vehicle, a make and model of the vehicle, a unique identity of one or more particular vehicle elements included in the vehicle, an owner of the vehicle, some combination thereof, etc.

At 606, one or more warning prompt interaction histories associated with an active user profile stored locally at the device are selectively accessed based on a determination of a match between a vehicle identity associated with the histories and the vehicle identity accessed from the detected vehicle at 604. In some embodiments, a determination of a match includes a determination that a particular warning prompt interaction history of an active user profile is associated with a particular type of vehicle which is common with the vehicle type of the detected vehicle, based at least in part upon processing the accessed vehicle identity data. In some embodiments, a determination of a match includes a determination that a particular warning prompt interaction history of an active user profile is associated with warning prompts for a particular vehicle element which is included in the detected vehicle, based at least in part upon processing the accessed vehicle identity data.

At 610, based on processing the one or more accessed warning prompt interactions histories, where each warning prompt interaction history is associated with at least a separate vehicle element, a particular warning prompt response to one or more associated vehicle element trigger events of the separate vehicle element is determined. The determination at 610 can include determining whether a warning prompt control module in the detected vehicle is to provide a standard warning prompt associated with a vehicle element, via one or more vehicle interfaces of the vehicle, in response to an occurrence of a trigger event associated with the vehicle element. For example, where an accessed warning prompt interaction history included in the user profile indicates that the occupant associated with the user profile has interacted with warning prompts associated with a particular vehicle element greater than a certain threshold quantity of times, the determination at 610 can include a determination to command the warning prompt control module to refrain from providing the standard warning prompt associated with the vehicle element in response to the trigger event associated with the vehicle element. Refraining from providing a standard warning prompt can include providing an altered warning prompt, which can include providing the standard warning prompt for a reduced period of time, withdrawing the warning prompt and enabling the associated vehicle element without requiring occupant interaction with a user interfaces, refraining from providing any warning prompt, some combination thereof, etc.

At 612, a determination is made regarding whether a trigger event associated with one or more vehicle elements included in the vehicle has occurred. If so, at 614, a warning prompt control module included in the vehicle is commanded to implement a warning prompt response associated with the vehicle element, based on the determination at 610. In some embodiments, the user device provides the warning prompt control module with the determined warning prompt responses associated with separate vehicle elements and trigger events, and the module implements elements 612 and 614. In some embodiments, the user device implements elements 612 and 614, such that the user device detects occurrence of the trigger event and, in response, generates a command to a warning prompt control module of the vehicle to implement the associated warning prompt response associated with the vehicle element and the occurred trigger event. Occurrence of the trigger event can be determined, at the user device, based at least in part upon data received from one or more portions of the vehicle via a communication network, monitoring of one or more portions of the environment surrounding the user device via data generated by one or more sensor devices included in the user device, etc.

At 616, where a warning prompt is provided, via one or more vehicle interfaces, at 614, occupant interaction with the warning prompt is tracked. Tracking occupant interaction can include determining whether the occupant has provided an acknowledgement of the warning prompt via interaction with one or more particular vehicle interfaces. In some embodiments, a vehicle element associated with the warning prompt is selectively enabled based at least in part upon a determination that the occupant has provided a particular acknowledgement of the warning prompt via a particular interaction with one or more particular vehicle interfaces.

In some embodiments, the tracking at 616 includes monitoring the occupant, via sensor data generated by one or more interior sensor devices, concurrently with providing the warning prompt. Such monitoring can include determining, based on sensor data representations of the occupant generated concurrently with the warning prompt being provided, that the occupant has observed the warning prompt for greater than a threshold period of elapsed time associated with comprehension of the content of the warning prompt. At 622, a warning prompt interaction history included in the user profile associated with the detected occupant and associated with the warning prompt provided at 614 is updated based on the providing at 614 and the tracking at 616. Where the occupant associated with the profile is determined, at 616, to have comprehended the warning prompt, provided acknowledgement of the warning prompt via interaction with one or more vehicle interfaces, some combination thereof, etc., the history can be updated to increment the quantity of interactions by the occupant associated with the profile with prompts associated with the vehicle element.

At 618, the driving performance of the occupant who is manually navigating the vehicle is tracked, via monitoring of one or more of the occupant via interior sensor devices, driving parameters of the manual navigation via vehicle sensor devices, some combination thereof, etc. At 620, a warning prompt interaction history included in the user profile associated with the detected occupant and associated with the warning prompt provided at 614 is updated based on the tracking at 618. For example, where an occupant is determined, at 618, to be utilizing a vehicle element in a manner which is inconsistent with a characterization of proper utilization of the vehicle element, the interaction history associated with warning prompts for the vehicle element can be updated to reduce the quantity of interactions with warning prompts for the vehicle element. As a result, the occupant, having been determined to be utilizing the vehicle element improperly, is provided with warning prompts which are more frequent, intrusive, etc. until the occupant is determined to be utilizing the vehicle element properly.

For example, where a vehicle element includes a rear-view camera device, proper utilization of the device includes maintaining manual observation of the external environment behind the vehicle, so that the camera device provides images which supplement the occupant's situational awareness, and the tracking at 430 includes determining that the occupant is utilizing images captured by the rear-view camera in place of manually observing the environment behind the vehicle, the updating at 620 can include updating an interaction history associated with warning prompts for the rear-view camera so that the prompts, indicating that proper utilization of the rear-view camera images is as a supplement to manual observation, are more frequent, require manual occupant interaction with a vehicle interface to acknowledge before the rear-view camera is enabled, etc.

Figure 7:
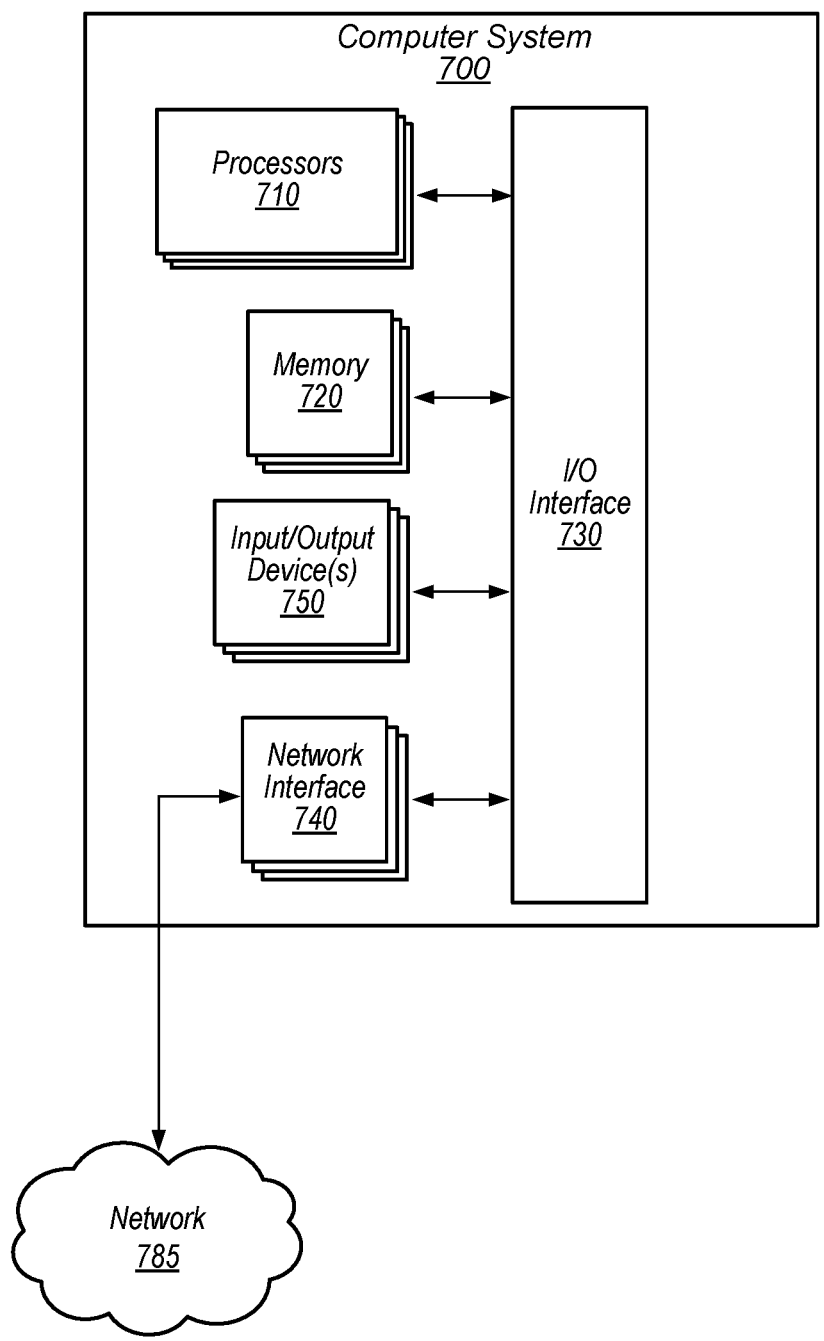
FIG. 7 illustrates a computer system that may be configured to include or execute any or all of the embodiments described herein.

FIG. 7 illustrates an example computer system 700 that may be configured to include or execute any or all of the embodiments described above. In different embodiments, computer system 700 may be any of various types of devices, including, but not limited to, a personal computer system, desktop computer, laptop, notebook, tablet, slate, pad, or netbook computer, cell phone, smartphone, PDA, portable media device, mainframe computer system, handheld computer, workstation, network computer, a camera or video camera, a set top box, a mobile device, a consumer device, video game console, handheld video game device, application server, storage device, a television, a video recording device, a peripheral device such as a switch, modem, router, or in general any type of computing or electronic device.

Various embodiments of warning prompt control module, remote warning prompt system, user device, some combination thereof, etc. as described herein, may be executed in one or more computer systems 700, which may interact with various other devices. Note that any component, action, or functionality described above with respect to FIG. 1 through 6 may be implemented on one or more computers configured as computer system 700 of FIG. 7, according to various embodiments. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices, which can include one or more user interface devices. In some cases, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions, data, etc. accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions included in memory 720 may be configured to implement some or all of a system incorporating any of the functionality described above. Additionally, existing control data of memory 720 may include any of the information or data structures described above. In some embodiments, program instructions and/or data may be received, sent or stored upon different types of computer-accessible media or on similar media separate from system memory 720 or computer system 700. While computer system 700 is described as implementing the functionality of functional blocks of previous Figures, any of the functionality described herein may be implemented via such a computer system.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices 760 attached to a network 785 (e.g., carrier or agent devices) or between nodes of computer system 700. Network 785 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices may, in some embodiments, include one or more display terminals, keyboards, keypads, touchpads, scanning devices, voice or optical recognition devices, or any other devices suitable for entering or accessing data by one or more computer systems 700. Multiple input/output devices may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

Memory 720 may include program instructions, which may be processor-executable to implement any element or action described above. In one embodiment, the program instructions may implement the methods described above. In other embodiments, different elements and data may be included. Note that data may include any data or information described above.

Those skilled in the art will appreciate that computer system 700 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An apparatus, comprising:
 a warning prompt control module configured to be installed in a vehicle and to adjustably control warning prompts displayed by the vehicle based on warning prompt interaction histories, wherein the warning prompt control module is configured to:
  determine a sensor data representation of an occupant device located in an interior of the vehicle based on processing sensor data generated by one or more sensor devices installed in the vehicle;
  associate the sensor data representation of the occupant device with a warning prompt interaction history, wherein the warning prompt interaction history includes data about past user interactions with displayed warning prompts associated with the occupant device and with a particular vehicle element included in the vehicle; and
  adjustably display warning prompts for the particular vehicle element included in the vehicle, via an interface of the vehicle, in response to trigger events associated with the particular vehicle element, based on the warning prompt interaction history associated with the occupant device so that the manner in which a particular warning prompt is displayed is altered for subsequent displays of the particular warning prompt;
 wherein to adjustably display warning prompts for the particular vehicle element included in the vehicle, the warning prompt control module is configured to:
  adjust content displayed in the warning prompts;
  selectively display a warning prompt response interface in the warning prompts; or
  adjust a display time of the warning prompts.

2. The apparatus of claim 1, wherein the warning prompt control module is configured to:
 monitor interaction with the displayed warning prompts; and
 adjust the warning prompt interaction history based on the monitored interaction.

3. The apparatus of claim 2, wherein the warning prompt control module is configured to:
 monitor driving performance subsequent to the monitored interaction with the displayed warning prompts; and
 adjust the warning prompt interaction history based on the monitored driving performance.

4. The apparatus of claim 1, wherein to adjustably display warning prompts for the particular vehicle element, the warning prompt control module is configured to:
 display a particular warning prompt, of a plurality of warning prompts associated with the particular vehicle element, based on a determination that a quantity of the past user interactions with the displayed warning prompts associated with the particular vehicle element in the warning prompt interaction history at least meets a threshold quantity associated with the particular warning prompt.

5. The apparatus of claim 1, wherein the warning prompt control module is configured to:
 access at least the sensor data representation of the occupant device from a remote system, which is external to the vehicle, via a communication network.

6. A method, comprising:
 adjustably controlling warning prompts displayed by the vehicle based on warning prompt interaction histories, wherein the adjustably controlling comprises:
  associating an occupant located in an interior of the vehicle with a particular profile, of a plurality of profiles, based on a comparison between a sensor data representation of the occupant and a sensor data representation associated with the particular profile; and adjustably displaying warning prompts for a particular vehicle element included in the vehicle, via an interface of the vehicle, in response to trigger events associated with the particular vehicle element, based on a warning prompt interaction history associated with the particular profile and the particular vehicle element so that the manner in which a particular warning prompt is displayed is altered for subsequent displays of the particular warning prompt, wherein the warning prompt interaction history includes data about past user interactions with displayed warning prompts associated with the particular profile and with the particular vehicle element; and wherein adjustably displaying the warning prompts for the particular vehicle element included in the vehicle comprises one or more of:

adjusting content displayed in the warning prompts;

selectively displaying a warning prompt response interface in the warning prompts; or adjusting a display time of the warning prompts.

7. The method of claim 6, comprising:

monitoring interaction with the displayed warning prompts; and adjusting the warning prompt interaction history based on the monitored interaction.

8. The method of claim 7, comprising:

monitoring driving performance subsequent to the monitored interaction with the displayed warning prompts; and adjust the warning prompt interaction history based on the monitored driving performance.

9. The method of claim 6, wherein adjustably displaying warning prompts for the particular vehicle element comprises:

displaying a particular warning prompt, of a plurality of warning prompts associated with the particular vehicle element, based on a determination that a quantity of the past user interactions with the displayed warning prompts associated with the particular vehicle element in the warning prompt interaction history at least meets a threshold quantity associated with the particular warning prompt.

10. The method of claim 6, comprising:

determining the sensor data representation of the occupant based on processing sensor data generated by one or more sensor devices installed in the vehicle; and accessing at least the sensor data representation associated with the entry of the profile from a remote system, which is external to the vehicle, via a communication network.

11. The apparatus of claim 1, wherein the warning prompt control module is further configured to:

associate an occupant located in an interior of the vehicle with a particular profile associated with the occupant device, based at least in part upon the sensor data representation of the occupant device and accessing data associated with the particular profile from the occupant device;

wherein to associate the sensor data representation of the occupant device with the warning prompt interaction history further comprises:

associating the particular profile with the warning prompt interaction history, and wherein to adjustably display warning prompts for the particular vehicle element, via an interface of the vehicle, in response to trigger events associated with the vehicle element, based on the warning prompt interaction history further comprises:

adjustably displaying warning prompts for the particular vehicle element based on the warning prompt interaction history associated with the particular profile and the particular vehicle element.

12. The apparatus of claim 11, wherein the warning prompt control module is configured to:

monitor interaction with the displayed warning prompts; and adjust the warning prompt interaction history based on the monitored interaction.

13. The apparatus of claim 12, wherein the warning prompt control module is configured to:

monitor driving performance subsequent to the monitored interaction with the displayed warning prompts; and adjust the warning prompt interaction history based on the monitored driving performance.

14. The apparatus of claim 11, wherein to adjustably display warning prompts for the particular vehicle element, the warning prompt control module is configured to:

display a particular warning prompt, of a plurality of warning prompts associated with the particular vehicle element, based on a determination that a quantity of the past user interactions with the displayed warning prompts associated with the particular vehicle element in the warning prompt interaction history at least meets a threshold quantity associated with the particular warning prompt.

15. The apparatus of claim 11, wherein:

the data associated with the particular profile accessed from the occupant device comprises a sensor data representation associated with the particular profile; and to associate the occupant located in an interior of the vehicle with a particular profile associated with the occupant device, the warning prompt control module is configured to base the association at least in part upon a correlation of a sensor data representation of the occupant with the sensor data representation associated with the particular profile.

16. A vehicle, comprising:

a controller comprising one or more processors and a memory storing program instructions that when executed by the one or more processors cause the one or more processors to:

associate an occupant located in an interior of the vehicle with a particular profile, of a plurality of profiles, based on a comparison between a sensor data representation of the occupant and a sensor data representation associated with the particular profile; and adjustably display warning prompts for a particular vehicle element included in the vehicle, via an interface of the vehicle, in response to trigger events associated with the particular vehicle element, based on a warning prompt interaction history associated with the particular profile and the particular vehicle element so that the manner in which a particular warning prompt is displayed is altered for subsequent displays of the particular warning prompt, wherein the warning prompt interaction history includes data about past user interactions with displayed warning prompts associated with the particular profile and with the particular vehicle element;

wherein the controller is configured to be installed in a vehicle; and wherein to adjustably display the warning prompts for the particular vehicle element included in the vehicle, the program instructions are executable by the one or more processors to:

adjust content displayed in the warning prompts;

selectively display a warning prompt response interface in the warning prompts; or adjust a display time of the warning prompts.

17. The vehicle of claim 16, wherein the program instructions are further executable by the one or more processors to:

monitor interaction with the displayed warning prompts; and adjust the warning prompt interaction history based on the monitored interaction.

18. The vehicle of claim 17, wherein the program instructions are further executable by the one or more processors to:

monitor driving performance subsequent to the monitored interaction with the displayed warning prompts; and adjust the warning prompt interaction history based on the monitored driving performance.

19. The vehicle of claim 16, wherein to adjustably display warning prompts for the particular vehicle element, the program instructions are executable by the one or more processors to:

display a particular warning prompt, of a plurality of warning prompts associated with the particular vehicle element, based on a determination that a quantity of the past user interactions with the displayed warning prompts associated with the particular vehicle element in the warning prompt interaction history at least meet a threshold quantity associated with the particular warning prompt.

20. The vehicle of claim 16, wherein the program instructions are further executable by the one or more processors to:

determine the sensor data representation of the occupant based on processing sensor data generated by one or more sensor devices installed in the vehicle; and access at least the sensor data representation associated with the profile from a remote system, which is external to the vehicle, via a communication network.

21. A non-transitory computer-readable medium storing program instructions that when executed by one or more processors cause the one or more processors to:

associate an occupant located in an interior of the vehicle with a particular profile, of a plurality of profiles, based on a comparison between a sensor data representation of the occupant and a sensor data representation associated with the particular profile; and adjustably display warning prompts for a particular vehicle element included in the vehicle, via an interface of the vehicle, in response to trigger events associated with the particular vehicle element, based on a warning prompt interaction history associated with the particular profile and the particular vehicle element so that the manner in which a particular warning prompt is displayed is altered for subsequent displays of the particular warning prompt, wherein the warning prompt interaction history includes data about past user interactions with displayed warning prompts associated with the particular profile and with the particular vehicle element; and wherein to adjustably display the warning prompts for the particular vehicle element included in the vehicle, the program instructions are executable by the one or more processors to:

adjust content displayed in the warning prompts;

selectively display a warning prompt response interface in the warning prompts; or adjust a display time of the warning prompts.

22. The non-transitory computer-readable medium of claim 21, wherein the program instructions are further executable by the one or more processors to:

monitor interaction with the displayed warning prompts; and adjust the warning prompt interaction history based on the monitored interaction.

23. The non-transitory computer-readable medium of claim 22, wherein the program instructions are further executable by the one or more processors to:

monitor driving performance subsequent to the monitored interaction with the displayed warning prompts; and adjust the warning prompt interaction history based on the monitored driving performance.

24. The non-transitory computer-readable medium of claim 21, wherein to adjustably display warning prompts for the particular vehicle element, the program instructions are executable by the one or more processors to:

display a particular warning prompt, of a plurality of warning prompts associated with the particular vehicle element, based on a determination that a quantity of the past user interactions with the displayed warning prompts associated with the particular vehicle element in the warning prompt interaction history at least meet a threshold quantity associated with the particular warning prompt.

25. The non-transitory computer-readable medium of claim 21, wherein the program instructions are further executable by the one or more processors to:

determine the sensor data representation of the occupant based on processing sensor data generated by one or more sensor devices installed in the vehicle; and access at least the sensor data representation associated with the profile from a remote system, which is external to the vehicle, via a communication network.

* * * * *